United States Patent
Nakajima

(10) Patent No.: US 8,918,829 B2
(45) Date of Patent: Dec. 23, 2014

(54) COMMUNICATION SYSTEM AND TRANSMITTING-RECEIVING DEVICE

(75) Inventor: Yasuhisa Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1404 days.

(21) Appl. No.: 11/782,863

(22) Filed: Jul. 25, 2007

(65) Prior Publication Data

US 2008/0046950 A1    Feb. 21, 2008

(30) Foreign Application Priority Data

Aug. 15, 2006  (JP) ................. 2006-221636

(51) Int. Cl.

| | |
|---|---|
| H04N 7/173 | (2011.01) |
| G06F 13/00 | (2006.01) |
| H04N 7/18 | (2006.01) |
| H04N 5/782 | (2006.01) |
| H04N 9/804 | (2006.01) |
| H04N 5/85 | (2006.01) |
| H04N 9/87 | (2006.01) |
| H04N 21/4363 | (2011.01) |
| H04N 9/64 | (2006.01) |
| H04N 5/44 | (2011.01) |
| H04N 5/775 | (2006.01) |
| H04N 21/426 | (2011.01) |
| G09G 5/00 | (2006.01) |
| H04N 21/41 | (2011.01) |

(52) U.S. Cl.
CPC .............. *H04N 5/775* (2013.01); *H04N 5/782* (2013.01); *H04N 9/8042* (2013.01); *H04N 21/42646* (2013.01); *H04N 5/85* (2013.01); *G09G 5/006* (2013.01); *G09G 2370/047* (2013.01); *H04N 9/8715* (2013.01); *H04N 21/4122* (2013.01); *H04N 21/43632* (2013.01); *H04N 9/641* (2013.01); *H04N 21/43635* (2013.01); *H04N 5/4401* (2013.01)
USPC .............................. 725/118; 710/110; 725/80

(58) Field of Classification Search
CPC ............ H04N 5/4401; H04N 7/17309; H04N 7/17318; H04N 5/50; H04N 7/17354
USPC ............................ 725/80; 710/1–5; 348/734
See application file for complete search history.

(56) References Cited

U.S. PATENT DOCUMENTS

| | | | |
|---|---|---|---|
| 5,608,457 A | 3/1997 | Tohyama et al. | |
| 6,349,352 B1 * | 2/2002 | Lea ................................. | 710/72 |

(Continued)

FOREIGN PATENT DOCUMENTS

| | | |
|---|---|---|
| EP | 1 519 263 A2 | 3/2005 |
| EP | 1 657 916 A1 | 5/2006 |

(Continued)

OTHER PUBLICATIONS

Partial Search Report issued Mar. 31, 2011 in European Patent Application No. 07113418.3-2202/1890291.

(Continued)

*Primary Examiner* — Benjamin R Bruckart
*Assistant Examiner* — Anthony Bantamoi
(74) *Attorney, Agent, or Firm* — Oblon, Spivak, McClelland, Maier & Neustadt, L.L.P.

(57) ABSTRACT

Disclosed is a communication system that includes a source device outputting video contents, a sink device inputting the video contents, and a control transmission line and a video transmission line both connecting with the source device and the sink device to transmit data therebetween via the control transmission line and the video transmission line. The source device includes a control data I/O unit, a video data output unit, a control feature corresponding memory unit, a control unit. The sink device includes a control data I/O unit, a video data input device inputting video data via the video transmission line, a control feature corresponding memory unit, a control unit.

14 Claims, 15 Drawing Sheets

(56) References Cited

U.S. PATENT DOCUMENTS

| | | | |
|---|---|---|---|
| 6,512,767 B1* | 1/2003 | Takeda et al. | 370/389 |
| 7,386,641 B2* | 6/2008 | Xu et al. | 710/19 |
| 2003/0103570 A1* | 6/2003 | Du Val | 375/240.26 |
| 2004/0080671 A1 | 4/2004 | Siemens et al. | |
| 2004/0095509 A1 | 5/2004 | Okamoto et al. | |
| 2004/0143847 A1 | 7/2004 | Suzuki et al. | |
| 2004/0239816 A1 | 12/2004 | Ando | |
| 2005/0068346 A1 | 3/2005 | Ogawa et al. | |
| 2005/0102699 A1* | 5/2005 | Kim et al. | 725/81 |
| 2006/0093022 A1* | 5/2006 | Ukai et al. | 375/214 |
| 2006/0256241 A1 | 11/2006 | Suzuki et al. | |
| 2007/0070402 A1* | 3/2007 | Kitayama et al. | 358/1.15 |
| 2007/0098352 A1 | 5/2007 | Cha et al. | |

FOREIGN PATENT DOCUMENTS

| | | |
|---|---|---|
| EP | 1 784 019 A2 | 5/2007 |
| JP | 11-275117 | 10/1999 |
| JP | 2003-5732 | 1/2003 |
| JP | 2003-259241 | 9/2003 |
| JP | 2004-191454 | 7/2004 |
| JP | 2004-208290 | 7/2004 |
| JP | 2004-280075 | 10/2004 |
| JP | 2005-31713 | 2/2005 |
| JP | 2005-167387 | 6/2005 |
| JP | 2005-250112 | 9/2005 |
| WO | WO 02/078336 A1 | 10/2002 |
| WO | WO 2006/044749 A2 | 4/2006 |

OTHER PUBLICATIONS

Hitachi et al., "High-Definition Multimedia Interface Specification Version 1.3a", Internet Citation, XP002476103, Nov. 10, 2006, URL:http://www.hdmi.org/download/HDMISpecifiaction13a.pdf, 276 pages.

\* cited by examiner

FIG. 7

| Address | Device |
|---|---|
| 0 | TV |
| 1 | Recording Device 1 |
| 2 | Recording Device 2 |
| 3 | STB1 |
| 4 | DVD |
| 5 | Audio |
| 6 | STB2 |
| 7 | STB3 |
| 8 | DVD2 |
| 9 | Recording Device 3 |
| 10 | Not Defined |
| 11 | Not Defined |
| 12 | Not Defined |
| 13 | Not Defined |
| 14 | Free Use |
| 15 | Not Registered (Source), Broadcast (Sink) |

FIG. 8

| OP-Code | Value | Parameter | Response | Mandatory Commands for Sorce All Source | Mandatory Commands for Sink All |
|---|---|---|---|---|---|
| ⟨Active Source⟩ | x82 | [Logic Address] | None | All Source | TV |
| ⟨Image View-On⟩ | x04 | None | None | | TV |
| ⟨Text View-On⟩ | x0D | None | None | | TV |
| ⟨Standby⟩ | x36 | None | None | TV | All |
| ⟨Deck Control⟩ | x42 | [Control Mode] | Action | | |
| ⟨Reproduction⟩ | x41 | [Play Mode] | Action | | |
| ⟨Vender Command⟩ | x89 | [Vender Agreed Data] | Vender Setting | | |
| ⟨Vender Remote Button Down⟩ | x8A | [Vender RC Code] | Vender Setting | | |
| ⟨Set OSD String⟩ | x64 | [Display-In Control] [OSD String] | Display String | | |
| ⟨User Control Operation⟩ | x44 | [UI Command] | Action Command | | |
| ⟨Report Power Status⟩ | x90 | [Power Status] | None | | |

FIG. 10

| Byte | 7 | 6 | 5 | 4 | 3 | 2 | 1 | 0 |
|---|---|---|---|---|---|---|---|---|
| 0 | Tag Code | | | | Data Length (=N) | | | |
| 1…3 | 24bit IEEE Registration Identifier | | | | | | | |
| 4 | A | | | | B | | | |
| 5 | C | | | | D | | | |
| 6 | Supports-AI | DC_48bit | DC_36bit | DC_30bit | DC_Y444 | | | Not Defined |
| 7 | Max_TMDS_Clock | | | | | | | |
| 8 … X-1 | Status | | | | | | | |
| X … N-1 | Not Defined | | | | | | | |
| N | Not Defined | | | | | | | |

FIG. 11

| Byte | 7 | 6 | 5 | 4 | 3 | 2 | 1 | 0 |
|---|---|---|---|---|---|---|---|---|
| 8 | CEC | | CEC Version | | | Data Length (=M) | | |
| 9 | OT Play | OT Record | Standby | System | Deck | Tuner | OSD | Menu |
| 10 | Routing | Remote | OSD Name | Power | | | Not Defined | |
| 11 ... M-1 | Not Defined | | | | | | | |
| M | Vendor | | | Number of Vendor Specific Command | | | | |
| M+1 | Vendor Specific Command 1 | | | | | | | |
| M+2 ... X-1 | Vendor Specific Command 2... X | | | | | | | |

FIG. 12

| Byte | 7 | 6 | 5 | 4 | 3 | 2 | 1 | 0 |
|---|---|---|---|---|---|---|---|---|
| 0 | CEC | Not Defined | | | | Data Length (=L) | | |
| 1 | OT Play | | Status | | OT Record | | Status | |
| 2 | Standby | | Status | | System | | Status | |
| 3 | Deck | | Status | | Tuner | | Status | |
| 4 | OSD | | Status | | Menue | | Status | |
| 5 | Rouing | | Status | | Remote | | Status | |
| 6 ... L-1 | Not Defined | | | | | | | |

COMMUNICATION SYSTEM AND TRANSMITTING-RECEIVING DEVICE

CROSS REFERENCES TO RELATED APPLICATIONS

The present invention contains subject matter related to Japanese Patent Application JP 2006-221636 filed in the Japanese Patent Office on Aug. 15, 2006, the entire contents of which being incorporated herein by reference.

BACKGROUND OF THE INVENTION

1. Field of the Invention

The present invention relates to a communication system that is suitable for application to a system including a device to perform an input or output compliant with the HDMI (High-Definition Multimedia Interface) standard, which is a digital video-audio I/O interface standard, and a transmitting-receiving device used in the communication system.

2. Description of the Related Art

The HDMI standard has been developed as an interface standard to mutually communicate non-compressed digital video data and the like between a plurality of video devices. Based on the HDMI standard, the video data can be transmitted individually in one pixel unit as primary color data of each color. In the HDMI standard, audio data is also transmitted during a blanking period of the video data using a transmission line of the video data. The primary color data for transmission include primary color data of red, green and blue (R-data, G-data and B-data). It is also possible to transmit the primary color data of subtractive color mixture of cyan, magenta and yellow.

One pixel data of each color is basically transmitted per eight-bit unit. A synchronization signal such as a horizontal synchronization signal and a vertical synchronization signal is transmitted when each signal is provided. In addition, a transmission line for pixel clock of the video data and a transmission line for control data are also provided. Since the data transmission is configured such that the non-compressed digital video data is conducted based on a pixel unit as described, a high definition video and the like can be transmitted with copyright protection.

A device that generates a video signal source, such as a disk reproducing apparatus, is generally connected with a display device (such as a monitor receiver and a television receiver) in connecting the plurality of video devices using the transmission line (HDMI cable) of the HDMI standard. A device for outputting the video data and the like to the transmission line of the HDMI standard indicates a source device (output device) and a device for inputting the video data and the like through the transmission line of the HDMI standard indicates a sink device (input device).

Details of the HDMI standard are described in International Patent Publication No. WO2002/078336.

In the HDMI standard, a line capable of bi-directionally transmitting control data, a CEC (Consumer Electronics Control) line, is separately provided from the transmission line of the video data, in order to perform control between the source device and the sink device. Thus, it is possible to control an counterpart device using this CEC line. A control example using the CEC line is described in Unexamined Japanese Patent Application No. 2004-208290.

Since a control method using this CEC line is an optional in the HDMI standard, compatibility is not secured among devices of respective manufacturers corresponding to the HDMI standard. In the control method using the CEC line of the HDMI standard, a feature that should be followed minimally on the standard is prescribed as "Mandatory" (mandatory feature), but a control feature other than the mandatory feature is "Option" and there is no compatibility among respective manufacturers as long as the optional feature is used.

Therefore, if the plurality of video devices are connected by using the transmission line of the HDMI standard, it may be unidentifiable which command of the CEC standard the connected device complies with, and hence it may be unclear whether or not the connected device complies with a command until a key operation is performed to send the command and the connected devices are actually operated based on that key operation. If the key operation corresponding to a non-compliant feature is performed, it may not be easy for the user to know that the device is non-compliance since non-compliance device can be identified only when no operation is performed after the reception of the command.

According to an embodiment of the present invention, a compliant control feature of an counterpart device can be easily identified in a case that a plurality of devices are connected by using such transmission line.

SUMMARY OF THE INVENTION

The embodiment of the present invention is applied to a case in which a connection is made between a source device to output video contents and a sink device to input the video contents by using a control transmission line and a video transmission line so that data is transmitted through the control transmission line and video transmission line.

In a case of the source device, the device includes a control data I/O unit to input and output control data through the control transmission line, a video data output unit to output video data through the video transmission line, a control feature corresponding memory unit to store the correspondence of control data that can be inputted and outputted by the control data I/O unit, and a control unit to control the input and output of the control data to/from the control data I/O unit and the output of the video data from the video data output unit.

The sink device includes a control data I/O unit to input and output the control data through the control transmission line, a video data input unit to input the video data through the video transmission line, a control feature corresponding memory unit to store the correspondence of control data that can be inputted and outputted by the control data I/O unit, and a control unit to control the input and output of the control data to/from the control data I/O unit and the input of the video data to the video data input unit.

Further, at least either one of the control units of the source device and sink device performs processing in which compliance information of the control data stored on the control feature corresponding memory unit of the counterpart device is read out through the transmission line and the read-out information is compared with information stored on the control feature corresponding memory unit in the same device so that the control data that can be outputted from the control data I/O unit in the same device is determined based on the resulting comparison.

Accordingly, the compliance information of the control data stored on the control feature corresponding memory unit of each device connected with the transmission line is compared so that a compliant state in the counterpart device can be determined.

According to the embodiment of the present invention, if devices differing in manufacturers, versions and the like are connected, it is automatically determined whether the device is controllable with connection, so that the connected device may not include information on the compliance or non-compliance and operability can be improved when a control system of the devices is formed using such transmission line.

BRIEF DESCRIPTION OF THE DRAWINGS

FIG. 7 is an explanatory diagram showing a configuration example of a logic address according to an embodiment of the present invention;

FIG. 8 is an explanatory diagram showing a configuration example of command data according to an embodiment of the present invention;

FIG. 10 is an explanatory diagram showing an example of an EDID data block according to an embodiment of the present invention;

FIG. 11 is an explanatory diagram showing an example of a CEC status data block according to an embodiment of the present invention;

FIG. 12 is an explanatory diagram showing an example of a CEC database according to an embodiment of the present invention;

DESCRIPTION OF THE PREFERRED EMBODIMENTS

Hereinafter, embodiments of the present invention are described by referring to accompanied drawings.

In an embodiment, a system is configured such that a plurality of video devices are connected using a transmission line compliant with the HDMI standard in order to transmit video contents, and the like between a video output device (source device) and a video input device (sink device). A video disk recorder that records (video recording) and reproduces the video data, and the like on a disk, such as a DVD (Digital Versatile Disk) used as a recording medium, is used as the video output device. A television receiver, which is a video display device, is used as the video input device.

Figure 1:
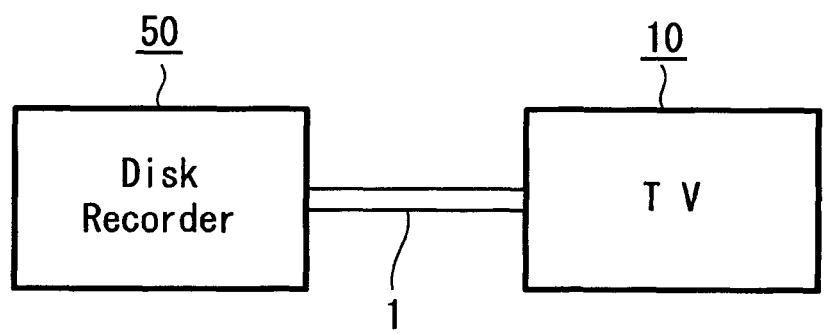
FIG. 1 is a block diagram showing a configuration example of a system according to an embodiment of the present invention.

FIG. 1 is a diagram showing a configuration example of a system according to this embodiment. A disk recorder 50 of the source device and a television receiver 10 of the sink device are connected by using a cable 1 of the HDMI standard (referred to as a HDMI cable, hereinafter). Although the example having one set of source device is shown in this embodiment, the system may be configured such that a plurality of source devices are connected in a case that there are a plurality of terminals of the HDMI standard provided in the sink device.

Figure 2:
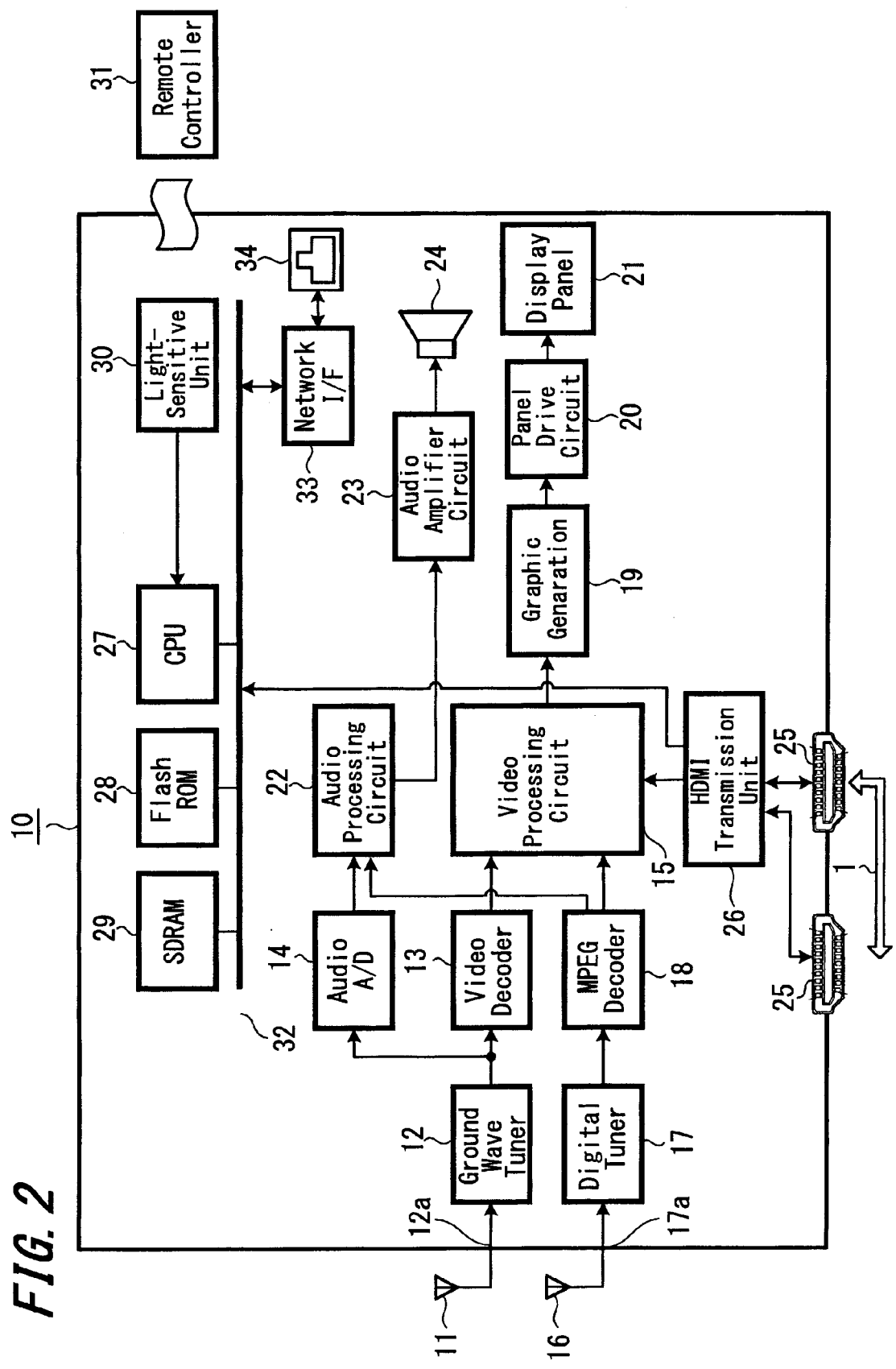
FIG. 2 is a block diagram showing a configuration example of a sink device according to an embodiment of the present invention.

FIG. 2 is a diagram showing a configuration of the television receiver 10 as the sink device. The television receiver 10 has an analogue broadcasting reception antenna input terminal 12a with which a ground wave antenna 11 is connected and a digital broadcasting reception antenna input terminal 17a with which a digital broadcasting reception antenna 16 is connected.

A broadcast wave signal inputted from the terrestrial analogue broadcasting antenna input terminal 12a is received by a ground wave analogue tuner 12 in which video and audio signals are demodulated into a baseband. The received and thus obtained video signal is converted into digital component data in a video decoder 13. The received and thus obtained audio signal is converted into a digital signal in an audio analogue/digital converter 14.

The broadcast wave signal inputted from the digital broadcasting antenna input terminal 17a is converted into an MPEG-TS stream with a digital demodulation tuner 17. The MPEG-TS stream is supplied to an MPEG (Moving Picture Experts Group) decoder 18, with which the video data is converted into the digital component data and the audio data is converted into the digital audio data.

Each of converted video data is supplied to a video processing circuit 15, so that various video processing is performed thereon, and then the processed video data is supplied to a graphic generation circuit 19. In the graphic generation circuit 19, a graphic screen necessary for an operation of the television receiver 10 is generated under control of a later-described CPU 27 so that the generated graphic screen is superimposed on the video data or replaced with the video data. A user interface screen, such as a menu screen, is also produced in this graphic generation circuit 19. The video data outputted from the graphic generation circuit 19 is supplied to a panel drive circuit 20. The panel drive circuit 20 drives a display on a display panel 21 based on the supplied video data, so that the video is displayed on the display panel 21.

In addition, the converted audio data is supplied to an audio processing circuit 22, so that various audio processing is performed thereon, and then the obtained audio data is supplied to an audio amplifier circuit 23 in which the audio is adjusted to a necessary volume and then outputted from a speaker 24.

Various processing is performed under control of a CPU (Central Processing Unit) 27 in this television receiver 10 that is a control unit to control an operation of the whole receiver. Software (program) necessary for the control in the CPU 27 is stored on a flush ROM 28 and the software is executed by using a SDRAM 29. Those CPU 27 and memories 28 and 29 are connected by using an internal bus 32. Data inputted from the outside is also stored by using the SDRAM 29 or flush ROM 28 under the control of the CPU 27. As the data supplied from the outside and stored on those memories, there are update data of software and the like, for example.

In addition, the television receiver 10 of the embodiment includes a light-sensitive unit 30 (receiving unit) for receiving a remote control signal and is configured such that the remote control signal (infrared signal) sent from another remote controller 31 is photo-sensed (received) and a control command directed by the remote control signal is sent to the CPU 27.

The television receiver 10 of the embodiment includes an HDMI terminal 25 and a network terminal 34 as external input terminals. The HDMI terminal 25 functions as a video data input unit that inputs the baseband video data and the like, and then input processing is performed on the inputted digital baseband data with a HDMI transmission unit 26, from which the video data is supplied to the video processing circuit 15 and the audio data is supplied to the audio processing circuit 22, so that the video data and audio data are processed in the respective circuits 15 and 22, thereby displaying video data and outputting audio data. As a memory unit for storing later-described EDID information (see FIG. 4), an EDID ROM 26 is provided in the HDMI transmission unit 26. This EDID ROM 26 may be configured such that the flush ROM 28 also serves as this EDIE ROM. In addition, the data transmitted and received through the DDC line and CEC line of the HDMI cable connected with the HDMI terminal 25 is received and transmitted under the control of the CPU 27 and HDMI transmission unit 26. The HDMI transmission unit 26 functions as an input unit and output unit of the control data transmitted through the DDC line and the CEC line. It should be noted that the embodiment in FIG. 2 represents an example in which two pairs of HDMI terminals 25 are provided.

The network terminal 34 is used for connecting with a network, such as the Ethernet®, and is connected with a network interface 33. The network interface 33 performs data transfer processing to an external device connected through the network terminal 34 under the control of the CPU 27.

Figure 3:
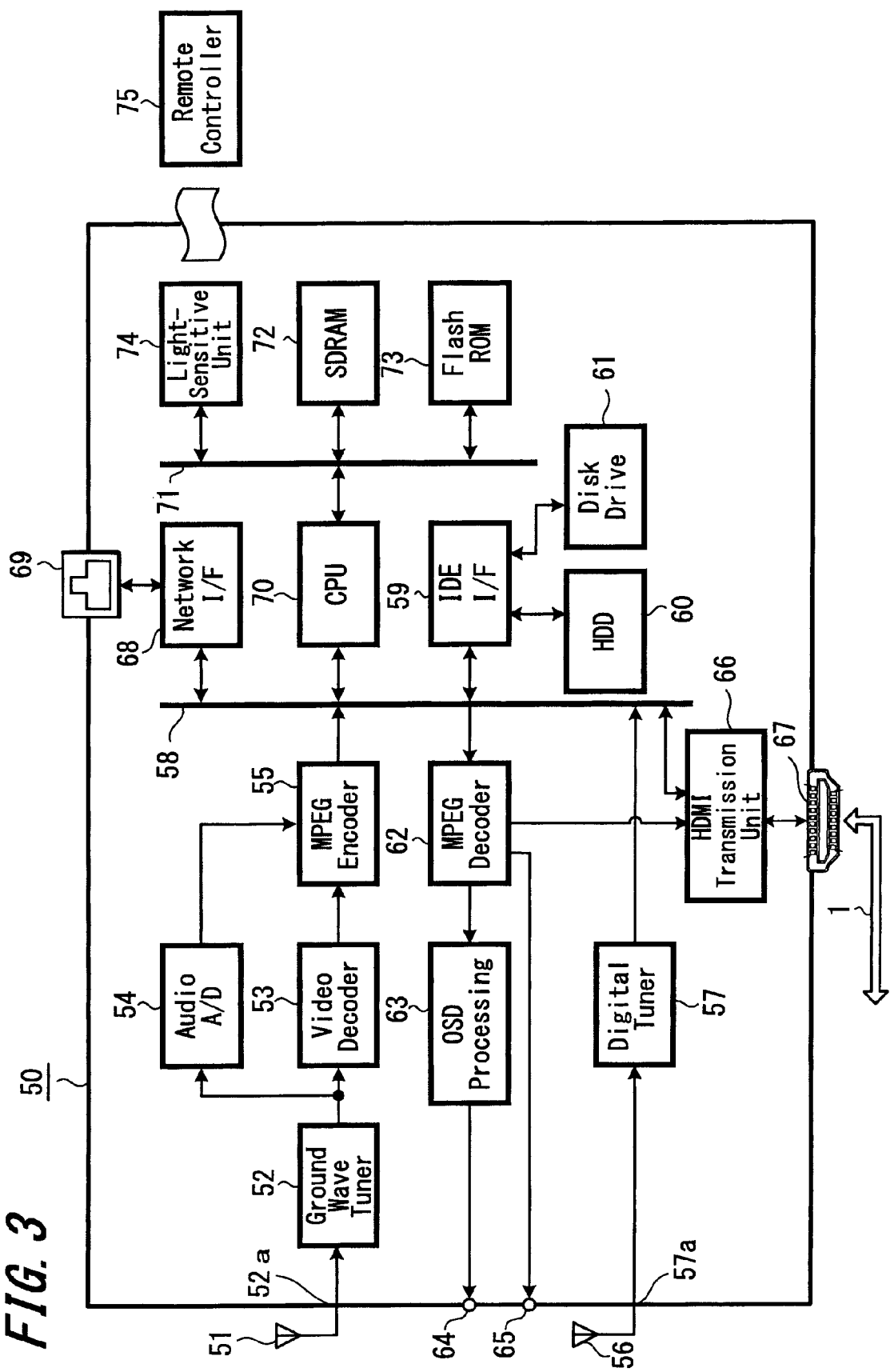
FIG. 3 is a block diagram showing a configuration example of a source device according to an embodiment of the present invention.

Next, FIG. 3 shows a configuration example of the disk recorder 50 used as the source device connected with this sink device. Here, the disk recorder 50 configured as a DVD recorder includes the DVD and hard disk used as a recording medium. in which. The disk recorder 50 has an analogue broadcasting reception antenna input terminal 52a with which a ground wave antenna 51 is connected and a digital broadcasting reception antenna input terminal 57a with which a digital broadcasting reception antenna 56 is connected.

The broadcast wave signal inputted from the terrestrial analogue broadcasting antenna input terminal 52a is supplied to a ground wave analogue tuner 52, in which the video and audio signals are demodulated into the baseband. The received and thus obtained video signal is converted into the digital component data in a video decoder 53. The received and thus obtained audio signal is converted into the digital data in an audio analogue/digital converter 54. The converted digital video data and audio data are supplied to an MPEG encoder 55, in which the supplied video and audio data are converted into the MPEG-TS stream.

The broadcast wave signal inputted from the digital broadcasting antenna input terminal 57a is converted into the MPEG-TS stream in a digital demodulation tuner 57.

Each converted MPEG-TS stream is sent to an IDE interface 59 through an internal bus 58 that is an interface circuit for recording unit. A hard disk drive 60 and an optical disk drive 61 are connected with the IDE interface 59. The hard disk drive 60 records (stores) a large volume of video data (MPEG-TS stream), and the like using the hard disk and reproduces the data recorded on the hard disk. The optical disk drive 61 records and reproduces the video data (MPEG-TS stream), and the like using an optical disk, such as the loaded DVD, as the recording medium.

The MPEG-TS stream reproduced by the hard disk drive 60 and the optical disk drive 61 is supplied to an MPEG decoder 62, in which the supplied MPEG-TS stream is converted into the digital video data and audio data. The converted video data is supplied to an OSD processing unit 63, in which a graphic screen for guide information display and explanatory title display of the disk is generated under control of a later-described CPU 70, so that the generated graphic screen is superimposed on the video data or replaced with the video data.

The video data processed in the OSD processing unit 63 is outputted from a video output unit 64. In addition, the audio data converted in the MPEG decoder 62 is outputted from an audio output unit 65.

Various processing performed in the disk recorder 50 is executed with the control of the CPU 70 that controls an entire operation of the whole recorder. Software (program) necessary for the control in the CPU 70 is stored on a flush ROM 73 and the software is executed by using a SDRAM 72. Those CPU 70 and memories 72 and 73 are connected with an internal bus 71.

Further, the disk recorder 50 of this embodiment includes a light-sensitive unit (receiving unit) 74 for receiving a remote control signal and is configured such that the remote control signal (infrared signal) sent from a remote controller 75 of a separate unit is photo-sensed (received) and a control command directed by that remote control signal is sent to the CPU 70. In a case that the remote controller 31 (FIG. 2) for the television receiver 10 has a disk recorder control feature, this remote controller 31 for the television receiver 10 may be also used as the remote controller 75.

The disk recorder 50 of the embodiment includes an HDMI terminal 67 and a network terminal 69 as external input terminals. The HDMI terminal 67 functions as the video output unit that outputs the baseband video data and the like, and the digital baseband data for output is (MPEG data) reproduced from the hard disk drive 60 or optical disk drive 61 that is decoded in the MPEG decoder 62 and then output processing is performed on the video data and audio data with an HDMI transmission unit 66.

As a memory unit to store EDIE information which is described later, an EDID ROM 66a (see FIG. 4) is provided in the HDMI transmission unit 66. The flush ROM 73 also serves as the EDID ROM 66a. The data to be received and sent through the DDC line and CEC line of the HDMI cable connected with the HDMI terminal 67 is received and sent under the control of the CPU 70 and HDMI transmission unit 66. The HDMI transmission unit 66 functions as the input unit and output unit of the control data transmitted through the DDC line and CEC line.

The network terminal 69 is connected with a network interface 68, as a terminal connecting to a network such as the Ethernet®. The network interface 68 performs data transfer processing to an external device connected through the network terminal 69 under the control of the CPU 70.

Figure 4:
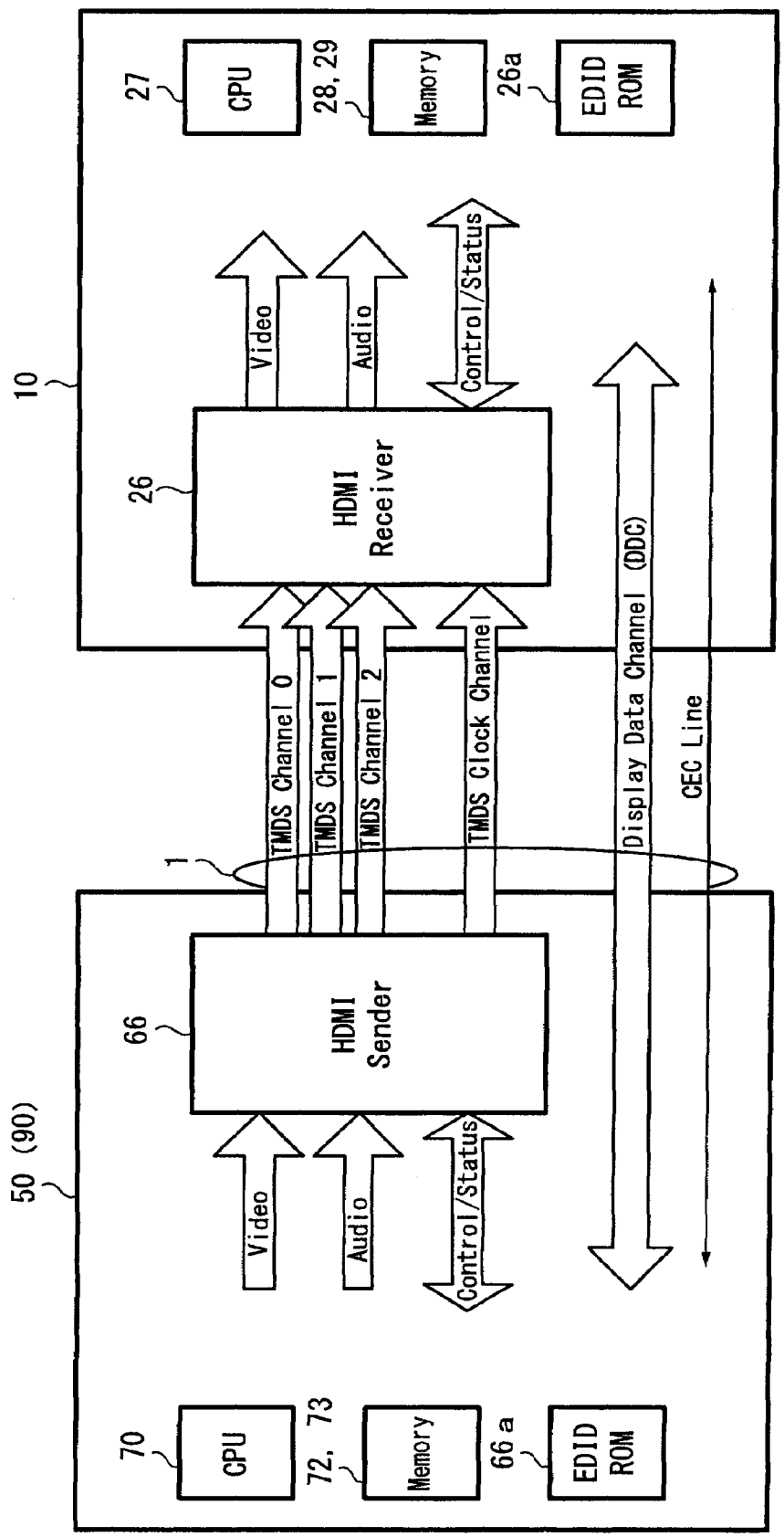
FIG. 4 is an explanatory diagram showing a configuration example of a transmission line using a cable according to an embodiment of the present invention.

Next, a configuration example of the data for each channel is described by referring to FIG. 4. The data for each channel is transmitted through the HDMI cable 1 between the HDMI terminal 67 of the disk recorder 50 and the HDMI terminal 25 of the television receiver 10. In the HDMI standard, three channels 0, 1 and 3 are provided for transmitting the video data and a clock channel for transmitting pixel clock is provided as shown in FIG. 4. In addition, a transmission line of power supply and the DDC and CEC are provided as the transmission lines of control data. The DDC (Display Data Channel) is a data channel mainly for display control, and the CEC (Consumer Electronics Control) is a data channel mainly for transmitting the control data in order to control the counterpart device connected via the cable.

According to the HDMI standard, the configuration of each channel is described as follows. Pixel data of B-data (blue data), vertical synchronization data, horizontal synchronization data and ancillary data are transmitted in the channel 0. Pixel data of G-data (green data), two kinds of control data (CTL0 and CTL1) and ancillary data are transmitted in the channel 1. Pixel data of R-data (red data), two kinds of control data (CTL2 and CTL3) and ancillary data are transmitted in the channel 2. It should be noted that the primary color data of the subtractive color mixture of cyan, magenta and yellow can be transmitted instead of the blue data, green data and red data.

The CEC that functions as the control data transmission line is a channel in which the data transmission is performed bi-directionally at a lower clock frequency than the channels (channels 0, 1 and 2) to transmit the video data.

In addition, the HDMI transmission units 66 and 26 of the source device and sink device include the EDID ROMs 66a and 26a as the memory units to store E-EDID (Enhanced Extended Display Identification Data) information. The E-EDID information stored on the memories 66a and 26a is information having a video data format, and the like, processed by the device (i.e., displayed, recorded, or reproduced). However, according to this embodiment, the E-EDID information is expanded, so that information about details of the device, more specifically, the control feature compliance information is stored in the memories. Specific examples of the E-EDID information and control feature compliance information are described later. According to this embodiment, the E-EDID information is referred to by reading out the information stored on the EDID ROM 66a or 26a of the counterpart device when the connection using the HDMI cable 1 is detected.

A data configuration transmitted via the channels (channel 0, channel 1, channel 2, clock channel and DDC) other than the CEC includes the same configuration of the data transmitted with the practically used HDMI system.

Next, a data configuration transmitted via the CEC channel and a processing example with the system according to this embodiment are described.

Figure 5:
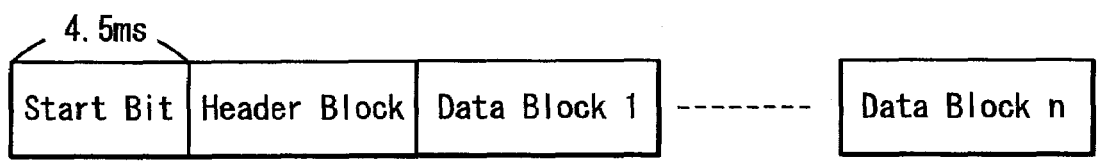
FIG. 5 is an explanatory diagram showing a configuration example of data of a CEC channel according to an embodiment of the present invention.

First, the data configuration transmitted via the CEC channel is described with reference to FIG. 5.

In the CEC channel, one block is configured to be transmitted at 4.5 msec. A start bit is provided when starting to transmit data, and a header block is allocated subsequent to the start bit, and an arbitrary number (n in FIG. 5: n is an arbitrary integer) of data blocks including the data are allocated subsequent to the header block.

Figure 6:
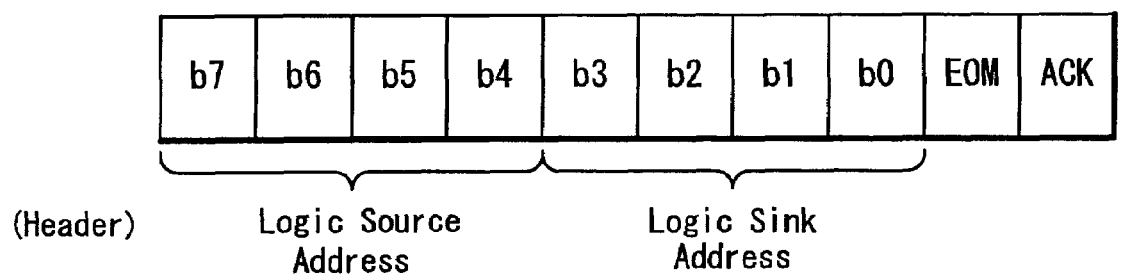
FIG. 6 is an explanatory diagram showing an example of a block configuration of a CEC channel according to an embodiment of the present invention.

FIG. 6 is a diagram showing an example of a data structure of the header block. The header block has a common data structure with the data block and includes a data pay load having eight bits, an EOM (End Of Message) bit, and an ACK (Acknowledge) bit.

In the header block, the logic address (four bits) of the source device and the logic address (four bits) of the sink device are allocated to the data pay load. The addresses are respectively set according to a type of each device.

FIG. 7 is a diagram showing a definition example of the logic address. In this embodiment, an address "0" of [TV] is used for the television receiver and an address "1" of [recording device] is used for the disk recorder 50.

FIG. 8 shows one example of the control command transmitted by the channel of the DDC. An op-code column indicates description of commands. In the commands, a command to request the source device, a command to display an image and text, a command to control a recording-reproduction apparatus (deck), a command to direct reproduction, and the like.

Here, the regions arbitrarily allocated by manufacturers includes [vendor command] and [vendor remote button down]. In this embodiment, E-EDID information is read out the data through the channel of the DDC using one or both of the control commands.

Figure 9:
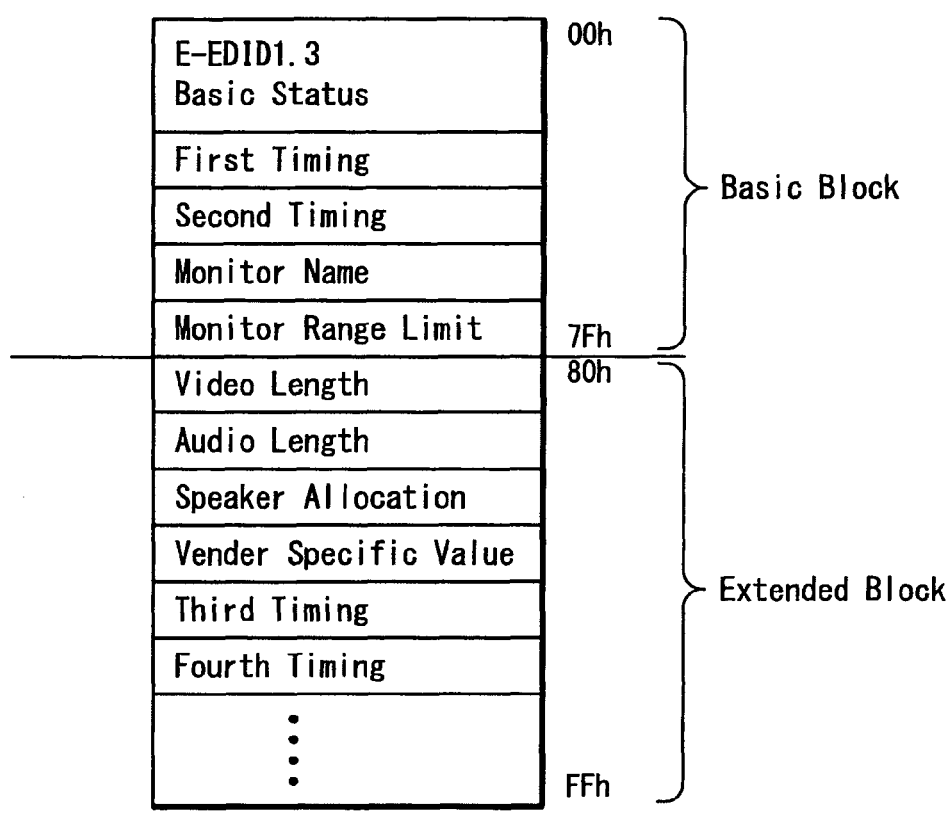
FIG. 9 is an explanatory diagram showing a configuration example of EDID data according to an embodiment of the present invention.

FIG. 9 is a diagram showing an example of a data structure of the E-EDID information in the EDID ROMs 66a and 26a, which is read out using such commands. In this embodiment, the E-EDID information is read out using the channel of the DDC. The transmission is performed in a format of I²C bus when transmitted via the channel of the DDC. The E-EDID information is composed of a basic block and an extended block. A basic status implicates a version of the HDMI standard complied with the device, and also implicates the display capability of video, and are allocated to the basic block. Ancillary data such as a video length (VIDEO SHORT) and a audio length (AUDIO SHORT) is allocated to the extended block. In the extended block, free regions used for a vendor specific value are provided. In this embodiment, information on the device is stored in the regions for the vendor specific value.

FIG. 10 is a diagram showing an example of a data block structure of the E-EDID information. An example of the region for the vendor specific value is shown in this FIG. 10. In the data block, a data array from the 0th block to the 7th block is complied with the already defined standard. A CEC command region is defined in the blocks subsequent to the 8th block.

FIG. 11 is a diagram showing an example of the data obtained in the CEC command region of the blocks subsequent to the 8th block in FIG. 10, according to the configuration of this embodiment. Header data indicating of the CEC command definition region is written in the 8th block. Subsequent three bytes indicate the corresponding version of the CEC. The number of blocks for the CEC command definition region is defined by the subsequent four bytes. Whether or not the features defined by the CEC commands are individually complied is recorded on the blocks from the 9th block to the (M-1)th block. The specific command allowed for the vendor to use is recorded in the Mth and later blocks. The control feature compliance information is stored on the E-EDID. The control feature compliance information indicates the compliant status corresponding to the respective features of the CEC commands.

FIG. 12 shows a structural example of a database for storing the compliant CEC control command based on the read-out E-EDID data when each device reads out the E-EDID data of the counterpart device. The database is stored on the SDRAM 29 or 72 using the control of the CPU 27 or 70, for example.

In the database of FIG. 12, a data header indicating that the database corresponds to the CEC control command is recorded with the 7th byte of the 0th block. The data length of the CEC database is recorded with the 3rd byte to the 0th byte in the 0th block. In each block of the 1st block to the (L-1)th block, the respective CEC control commends are recorded with the 7th byte and the 3rd byte. A graph showing the compliant status of the connected device is recorded with each byte other than 3rd and 7th bytes. Since three bytes are defined for recording the compliant status in this embodiment, the information of the connected devices up to twenty-four sets can be stored.

Figure 13:
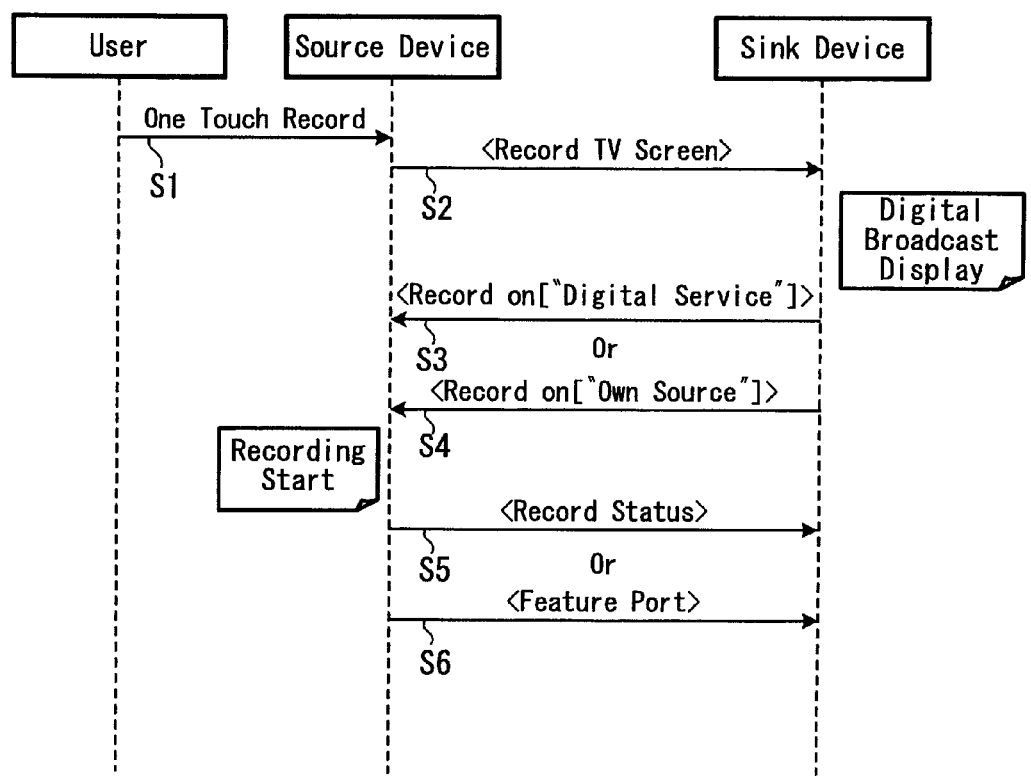
FIG. 13 is a timing chart showing a processing example of a CEC sequence according to an embodiment of the present invention.

Next, FIG. 13 shows an example of a sequence using such data structure when the source device and the sink device are connected.

Here, The example is described using [Record TV Screen], an optional feature in the CEC standard.

When a user directs to operate the command having the content to record a program of the same channel as the screen of the television receiver is given by an user's operation to the disk recorder that is the source device connected by using the HDMI cable 1 (step S1), the source device sends a request to the sink device by transmitting the command of [Record TV Screen] through the CEC line (step S2).

In response to the request at step S2, the sink device serves information of a digital broadcasting program currently displayed (step S3). Alternatively, if the program currently displayed on the sink device is inputted from the source device via the HDMI cable 1, the sink device assigns the reply information indicating that a video source is generated from the source device (step S4). In reply of step S3 or S4, the source device sends a status in recording (step S5) or a message incapable of activating this feature (step S6) back to the sink device. It should be noted that the user operation at step S1 may be performed in the sink device (television receiver).

Next, a processing example when the device is connected using the HDMI cable 1 is described with reference to a flow chart of FIG. 14.

Figure 14:
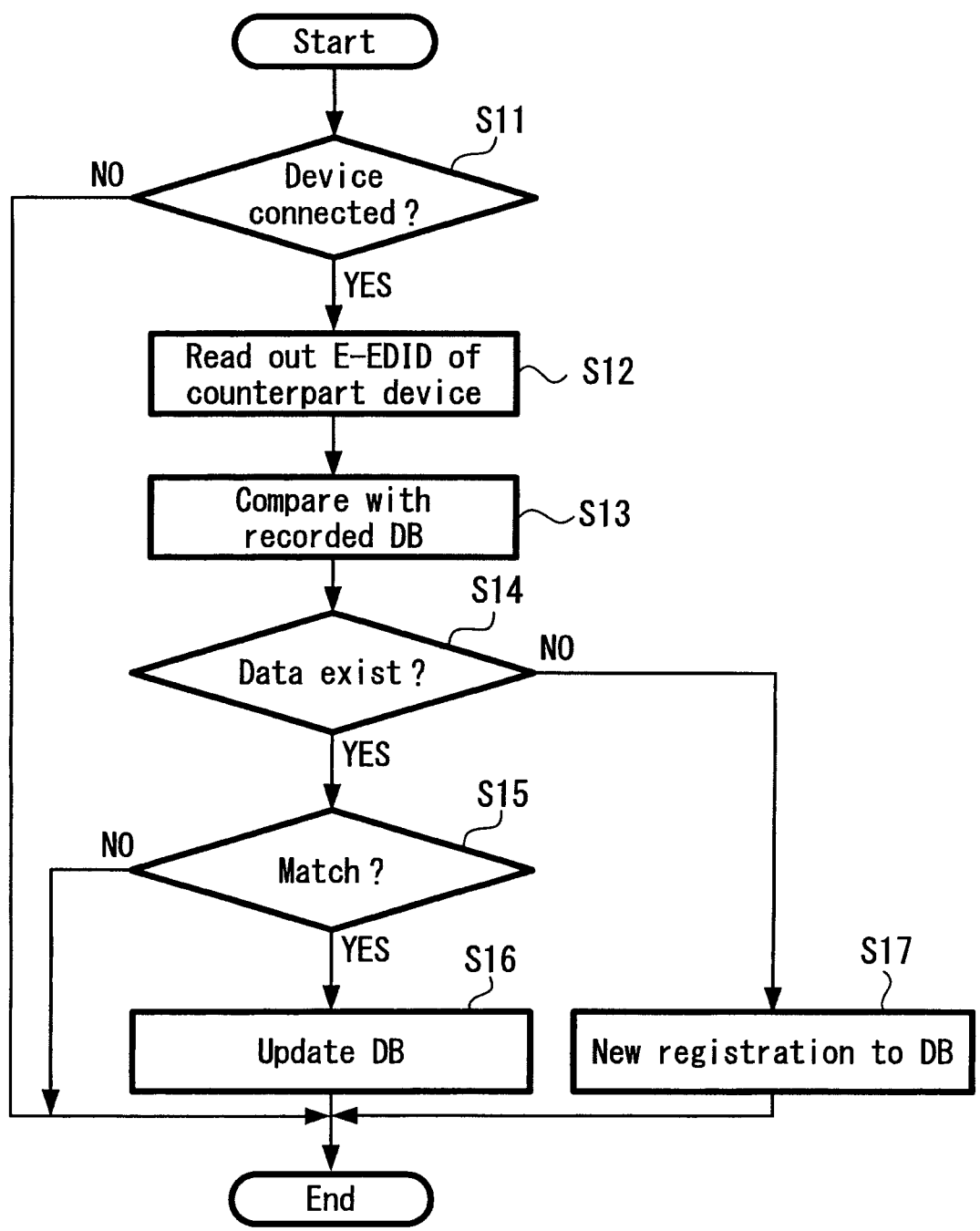
FIG. 14 is a flow chart showing a processing example at the time of a device connection according to an embodiment of the present invention.

FIG. 14 shows a confirmation processing procedure of the CEC compliance of the respective devices in a case that the devices connected by using the HDMI cable 1 are detected. This confirmation processing is performed by both of the source device and sink device according to this embodiment.

The processing shown in the flow chart of FIG. 14 illustrates a Hot Plug Detect as the feature prescribed in the HDMI standard. The Hot Plug Detect detects a connection between the source device and the HDMI terminal by observing voltage of an HDP terminal that is pulled up to a +5V power supply in the sink device, since the observed voltage is [L] voltage when the source device is connected with the HDMI terminal.

This feature is used to determine whether there is the device connection using the HDMI cable 1 (step S11); and this processing terminates if the device connection is not detected. If the device connection is detected, the E-EDID data stored on the EDID ROM of the counterpart device is read out using the line of the DDC (step S12). Then, the read-out data is compared with the E-EDID database that is stored in the same device (step S13). The database used for comparison is shown in FIG. 12, for example.

The comparison is used to determine whether or not there is corresponding data in the counterpart device (step S14). If no data is present in the database, the device is determined as the newly connected device. The newly read-out E-EDID data is registered in the database (step S17). If the data is present in the database, whether or not the existing data matches with the read-out data (step S15). If both data match with each other, it is determined that there is no change in the CEC compliance of the counterpart device, and this processing is ended. If both data are unmatched with each other, the new data is overwritten and updated as the database having stored the read-out data (step S16), and this processing is ended. In this manner, the E-EDID data of the connected device is read out by each device so that each device can indicate the updated status of the CEC compliance.

Figure 15:
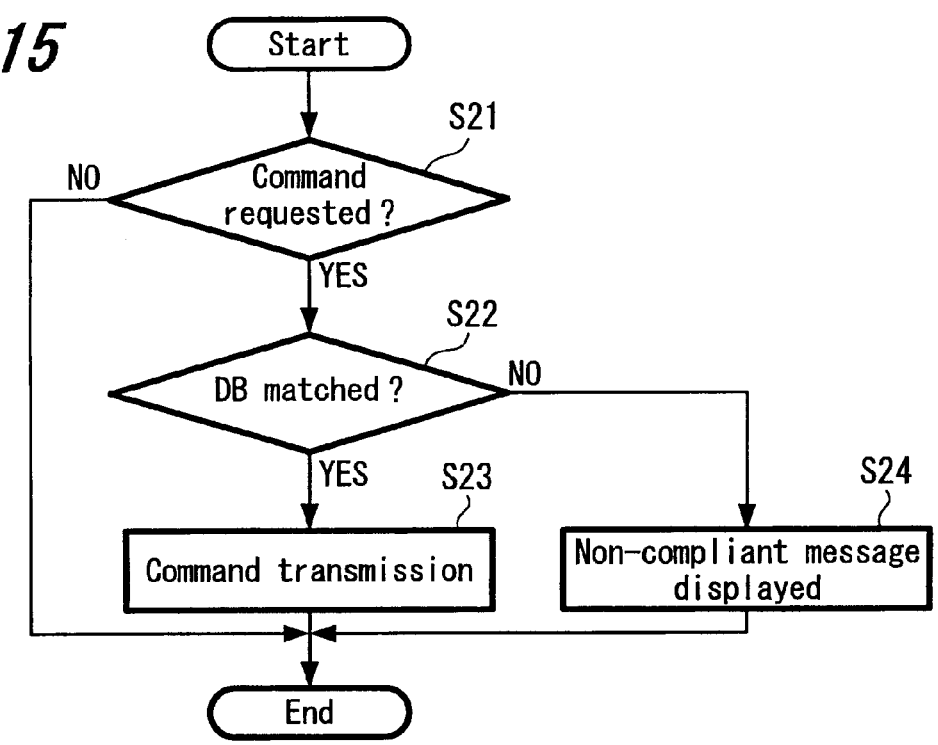
FIG. 15 is a flow chart showing an example (example 1) of command processing according to an embodiment of the present invention.

FIG. 15 shows a processing procedure of the source device and sink device when the processing is controlled by the control command using the actual the CEC line.

The control may start from the source device or the sink device when using the CEC line. A flow chart of FIG. 15 illustrate either cases, where the remote controller is used to carry out a remote control operation instructing an operation of the counterpart device by a user. For example, the operation of instructing the recording and reproduction in the disk recorder 50 is performed using the remote controller 31 of the television receiver 10, so that the corresponding remote control signal is transmitted to the light-sensitive unit 30 of the television receiver 10. In such a case, the control command is transmitted using the CEC line of the HDMI cable 1.

Figure 17:
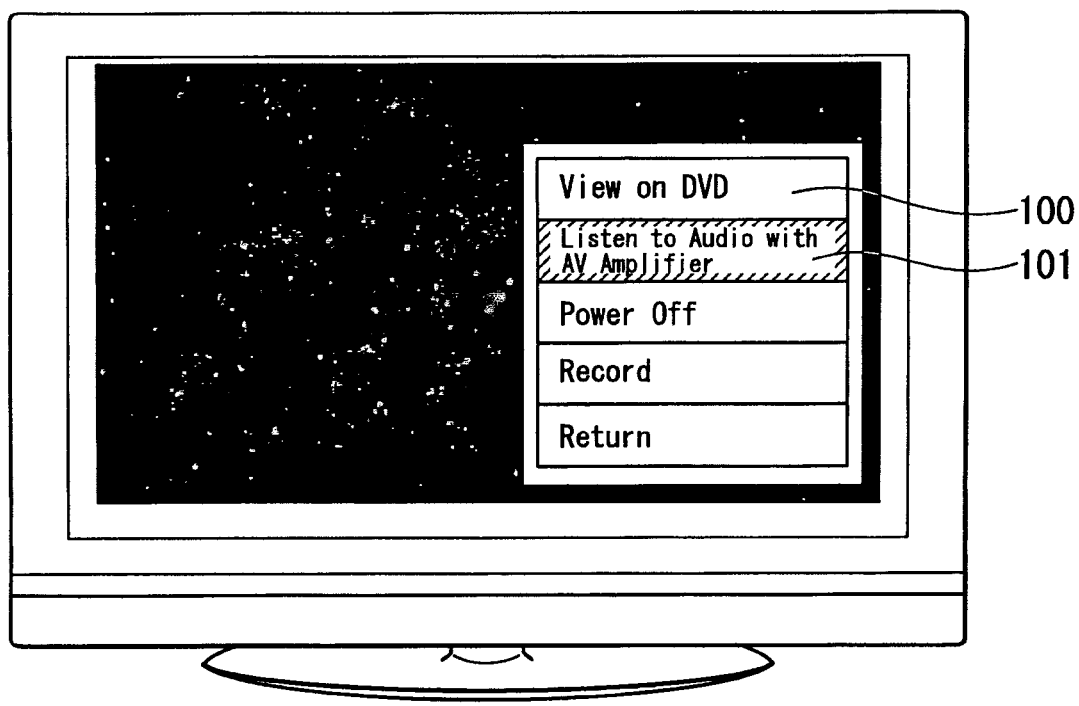
FIG. 17 is an explanatory diagram showing a display example based on obtained information according to an embodiment of the present invention.

When transmitting using such command, the processing of the flow chart shown in FIG. 15 is performed. More specifically, whether or not there is a request for the control between the devices using the CEC (step S21) is determined first. Here, if there is no request, the processing is ended. Then, if there is the request, whether or not the counterpart device complies with the requested command is determined with reference to the stored database (step S22). If the counterpart device is not complied with the requested command, a message indicating that the counterpart device is not complied with the requested command is displayed (step S24). If the requested command is complied with the device, the requested command is transmitted to the counterpart device (step S23) and the processing is ended. As the message display at step S24, a complied feature list 100 is displayed on the display screen of the television receiver, in which a non-complied feature 101 is displayed in a manner differing from the other features as shown in FIG. 17, for example. The display of the feature 101 includes a darker color than the display of the other features, for example, so that the user can clearly notice that this feature 101 cannot be selected. Furthermore, a message indicating the non-compliance like "The corresponding feature cannot be used" is displayed if such non-complied feature 101 is selected by the key operation of the remote controller and the like.

Figure 16:
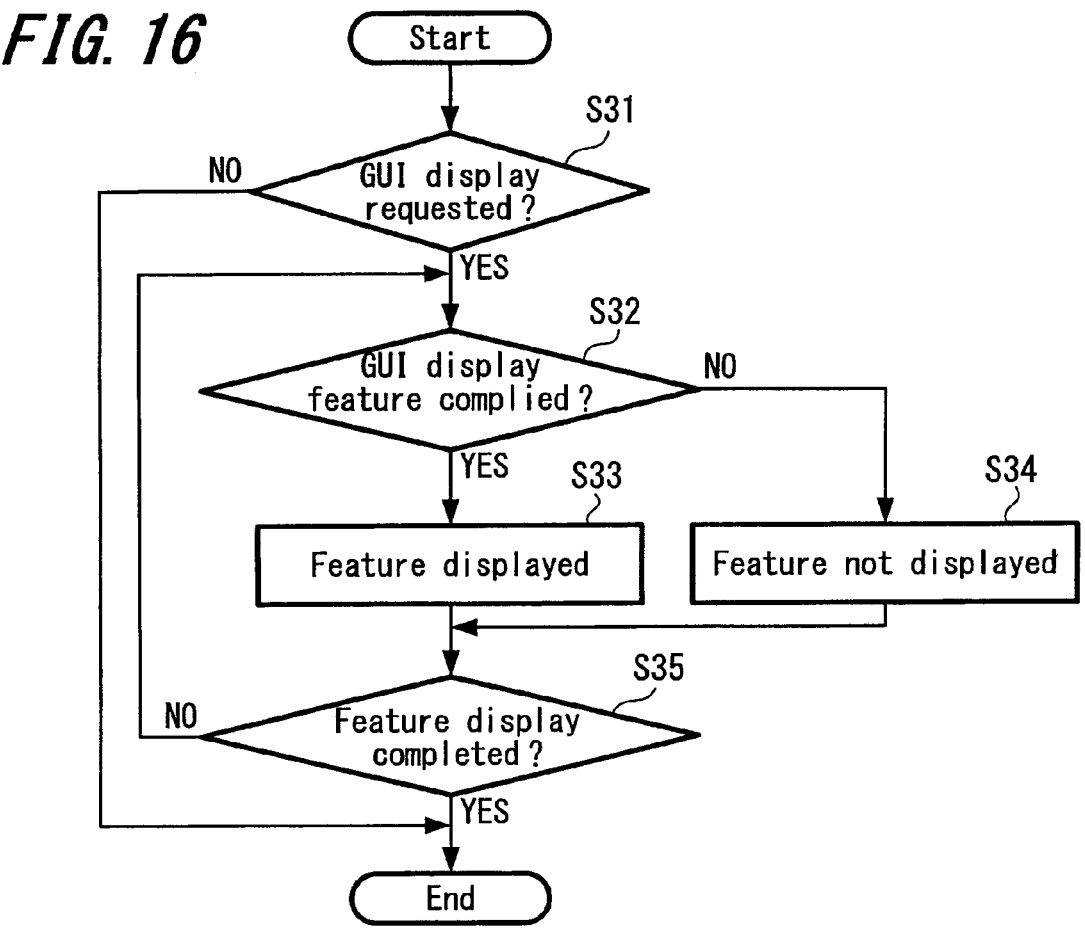
FIG. 16 is a flow chart showing an example (example 2) of command processing according to an embodiment of the present invention.

The remote control direct key is used for describing the processing procedure shown in the flow chart of FIG. 15; however, the processing procedure may follow a flow chart of FIG. 16, if the control is performed using the screen user interface of the sink device. More specifically, the control command determines whether or not a user requests for displaying the menu screen using the GUI (Graphical User Interface), and the like to control between the devices (step S31). Here, if no request is provided, the control command terminates the processing. If there is the request, it is determined by referring to the stored database whether the counterpart device complies with the control command which the same device (Initiator) complies with (step S32). Here, in a case that the counterpart device does not comply, the display instructing such control command is changed not to be displayed (step S34), and the processing proceeds to next step S35. In a case that the counterpart device complies, the features of the counterpart device and the like are displayed (step S33). Then, it is determined whether the judgment of the display or non-display is made to all of the complied commands of the same device (step S35), and the processing starting from step S32 is repeated in a case that the judgment is not yet finished to all the complied commands. In a case that the judgment has been finished, this processing is ended.

Whether or not the control using the CEC line of the HDMI cable can be performed is automatically determined within a device by conducting processing in this manner, based on the processing at the recognition of connection using the DDC line between the devices of different manufacturers, so that the control of this kind can be provided without user's recognition. In a case that there is a non-complied operation, such non-complied operation can be immediately notified by using the display of the television receiver and the like so that the operability can be improved. In addition, there is no need for a dedicated memory since the compliance information of the device is stored by using a part of E-EDID memory area that is normally used to store the data related to the display, and an updated change can be automatically coped with even in a case that the complied CEC control command is changed due to software update of the counterpart device since the data of the E-EDIC are read out without fail at the time of connecting with the HDMI cable.

It should be noted that the command configuration described in the embodiment illustrate only one example. The embodiment of the present invention is not limited thereto. Further, the CEC and DDC lines compliant with the HDMI standard are used for transmission in the above-described embodiment; however, lines (channels) other than the CEC and DDC lines may also be used for transmitting the control data.

In addition, the present embodiment employed interface compliant with the HDMI standard as the transmission line connecting the source device and the sink device; however, other transmission standards may also be used. Further, the present embodiment also employed the disk recorder as the source device and the television receiver as the sink device; however, another video output input device may be used as the source and sink devices, respectively.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
 a source device configured to output video contents,
 a sink device configured to input the video contents, and
 a cable including a control transmission line and a video transmission line both connecting with the source device and the sink device to transmit data therebetween via the control transmission line and the video transmission line,
 with the source device including
 a control data I/O unit that inputs and outputs control data via the control transmission line,
 a video data output unit that outputs video data via the video transmission line,
 a control feature corresponding memory unit that stores correspondence of control data that can be input and output via the control data I/O unit, and
 a control unit that controls input and output of the control data via the control data I/O unit and that controls output of the video data from the video data output unit; and
 with the sink device including
 a control data I/O unit that inputs and outputs control data via the control transmission line,
 a video data input device that inputs video data via the video transmission line,
 a control feature corresponding memory unit that stores correspondence of control data that can be input and output via the control data I/O unit, and
 a control unit that controls input and output of the control data via the control data I/O unit and that controls input of the video data from the video data input unit; wherein upon connecting the cable between the source device and the sink device, one of the control units of the source device and sink device, as a first device, reads out correspondence information of the control data stored on the control feature corresponding memory unit in the other device, as a second device, via the control transmission line, the first device compares the correspondence information with information stored on the control feature corresponding memory unit in the first device, determines compliant control data that can be output to the second device via the control data I/O unit in the first device based on the resulting comparison, and stores the compliant control data in a database in the respective control feature corresponding memory unit of the first device, and
 the determined compliant control data controls an operational function of the second device according to a process of: (1) a user requesting a command for the operational function of the second device through a user operation performed on the first device, (2), upon receiving the command through the user operation, the first device queries the database to determine whether a database match exists between the command and the compliant control data stored in the database in the respective control feature corresponding memory unit of the first device, and (3), when a determination by the first device indicates that there is the database match for the command, the first device transmits the command to the second device via the control transmission line.

2. The communication system according to claim 1, wherein the control feature corresponding memory unit is formed using information on a video format that is transmittable from the video data transmission unit stored in part of the memory region in the memory unit.

3. The communication system according to claim 1, wherein the control data I/O unit in the first device outputs the control data to the second device via the transmission line to control a function of the counterpart device.

4. The communication system according to claim 1, wherein the operational function is a recording operation.

5. The communication system according to claim 1, wherein the at least one of the control units determines compliant control data that can be output via the control data I/O unit in the first device based on the resulting comparison to determine and identify operations which can be performed by transmitting a corresponding command via the control transmission line to the second device.

6. The communication system according to claim 1, wherein the user operation performed on the first device is an operation performed on a remote control, which transmits a corresponding signal to the first device.

7. A transmitting-receiving device connected with a counterpart device to input or output video contents using a control transmission line and a video transmission line so that data is transmitted via the control transmission line and the video transmission line, the transmitting-receiving device comprising:
 a control data I/O unit configured to input and output control data via the control transmission line,
 a video data transmission unit configured to transmit video data via the video transmission line,
 a cable connector port configured to couple the control transmission line and the video transmission line into a connection port;
 a control feature corresponding memory unit configured to store correspondence of control data that can be input and output via the control data I/O unit, and a control unit that controls input and output of the control data via the control data I/O unit and that controls transmit of the video data via the video data transmit unit; wherein upon establishing a data connection between the cable connector port and a counterpart cable connector port of the counterpart device, the control unit reads out correspondence information of control data stored on a control feature corresponding memory unit in the counterpart device via the control transmission line, compares the correspondence information of the counterpart device with information stored on the control feature corresponding memory unit in the transmitting-receiving device, determines compliant control data that can be output via the control data I/O unit in the transmitting-receiving device based on the resulting comparison, and stores the compliant control data in a database in the control feature corresponding memory unit, and the determined compliant control data controls an operational function of the counterpart device according to a process of: (1) a user requesting a command for the operational function on the counterpart device through a user operation performed on the transmitting-receiving device, (2), upon receiving the command through the user operation, the transmitting-receiving device queries the database to determine whether a database match exists between the command and the compliant control data stored in the database in the respective control feature corresponding memory unit, and (3), when a determination by the transmitting-receiving device indicates that there is the database match for the command, the transmitting-receiving device transmits the command to the counterpart device via the control transmission line.

8. A transmitting-receiving device according to claim 7, wherein the control unit retrieves the control feature corresponding memory unit in the counterpart device when the control unit detects a connection of the transmission line.

9. A transmitting-receiving device according to claim 7, further comprising:

a notification processing unit configured to notify a non-compliant device that the counterpart device is non-compliant when the counterpart device is determined as non-compliant based on the comparison obtained by the control unit.

10. A transmitting-receiving device according to claim 9, wherein the notification is performed by the notification processing unit when the notification processing unit receives a command that operates a non-compliant device.

11. A transmitting-receiving device according to claim 9, wherein the notification is performed by the notification processing unit when displaying an operable device is requested.

12. A transmitting-receiving device according to claim 9, wherein the notification performed by the notification processing unit is displayed in a display manner that the compliant device is differentiated from the non-compliant device.

13. A transmitting-receiving device according to claim 7, wherein the control data I/O unit in the transmitting-receiving device outputs the control data to the counterpart device via the transmission line to control a function of the counterpart device.

14. A transmitting-receiving device according to claim 7, wherein the operational function is a recording operation.

* * * * *